Sept. 20, 1960   D. W. CHANEY   2,953,410
TRACTOR-TRAILER DUMPING MECHANISM

Filed March 20, 1957　　　　　　　　　　　　　　2 Sheets-Sheet 1

INVENTOR—
DONAL W. CHANEY
By Herbert Q. Minturn
ATTORNEY

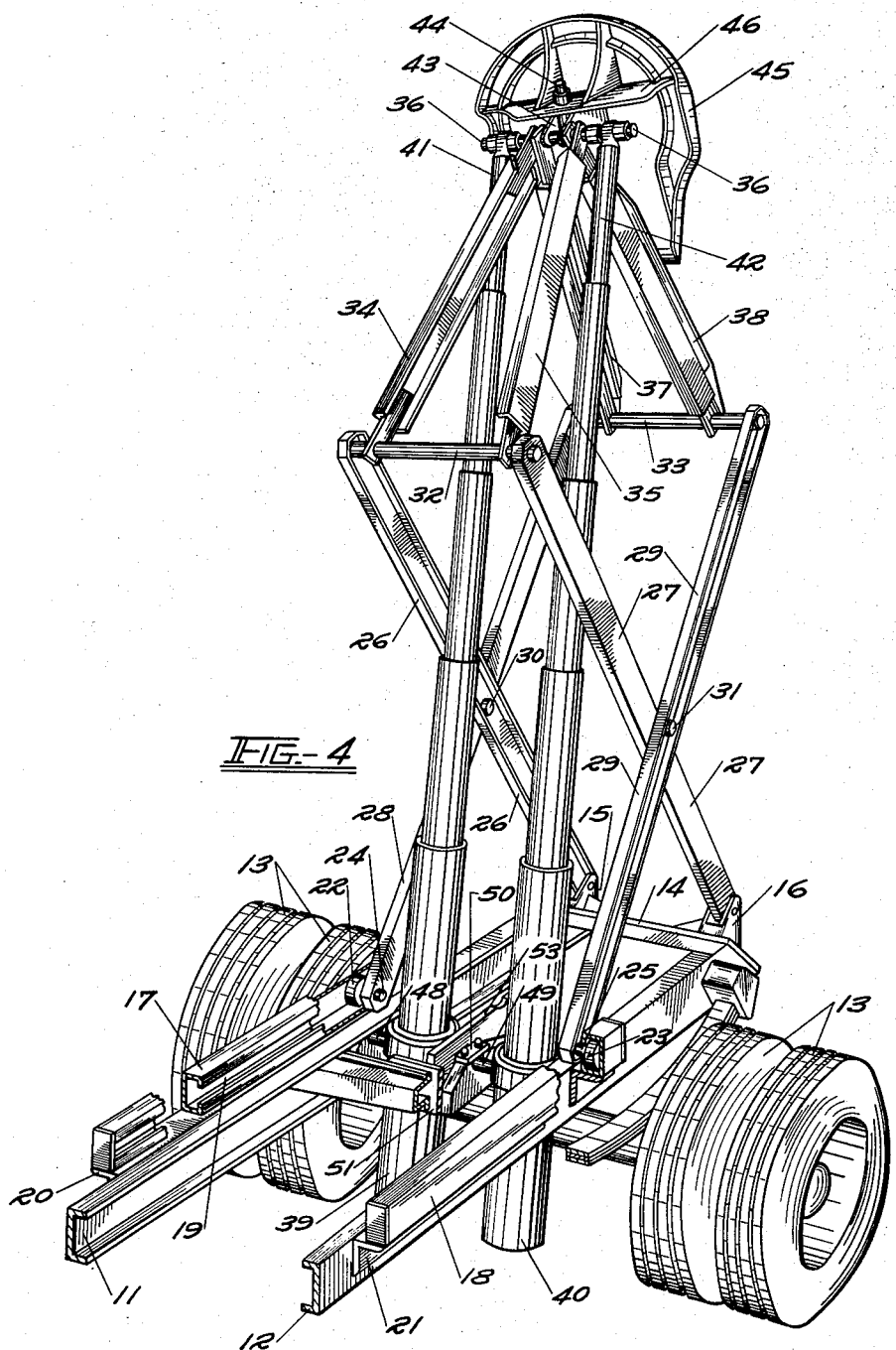

United States Patent Office 2,953,410
Patented Sept. 20, 1960

2,953,410

TRACTOR-TRAILER DUMPING MECHANISM

Donal W. Chaney, Cambridge City, Ind., assignor to Converto Manufacturing Company, Inc., Cambridge City, Ind., a corporation of Indiana Filed Mar. 20, 1957, Ser. No. 647,345

1 Claim. (Cl. 298—22)

Tractor drawn trailers are commonly attached to a tractor by having the forward end of the trailer rest on and be rockably connected with a fifth wheel mounted on the tractor. It is the primary object of this invention to provide a mechanism carried by the tractor which will elevate at will the forward end of the trailer without its being disconnected from the fifth wheel whereby the contents of the trailer may be dumped or caused to slide from the forward end to the rear end.

A further important object of the invention resides in this specific mechanism herein described and embodied in the appended claim such that the fifth wheel may be elevated in reference to the tractor without in any way rocking it in reference to the trailer or so manipulating it as would tend to cause the trailer to become disconnected from its engagement with the fifth wheel.

Other important objects of the invention are to provide an exceedingly simple yet most effective mechanism for the purpose intended and which may be economically operated. Further, the mechanism of the invention is comparatively light in weight, thereby not adding much to the gross weight of the combined tractor and trailer.

These and many objects and advantages of the invention will become apparent to those versed in the art in the following description of one particular form of the invention as illustrated in the accompanying drawings, in which:

Fig. 4 is a view in perspective of the mechanism in an elevated condition.

Figure 1:
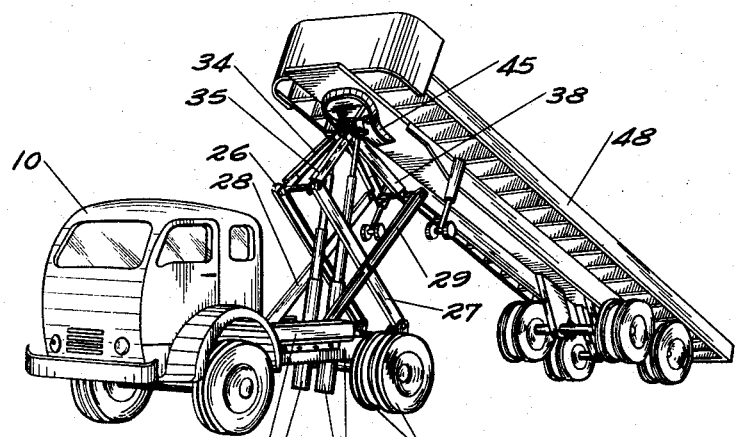
Fig. 1 is a view in perspective of a tractor and trailer to which the invention is applied.

A tractor generally designated by the numeral 10 has a short chassis constructed with side rails 11 and 12 in the usual manner, which are normally supported over rear wheels 13. The structure of the invention is mounted on these side rails 11 and 12.

A rear cross member 14 is fixed across the rear ends of the rails 11 and 12, herein shown as being positioned to be inclined upwardly and forwardly from the lower edges of the rails 11 and 12. U brackets 15 and 16 are fixed respectively toward outer ends of the cross member 14 on the rear, upper side thereof.

A C cross-section track 17 is mounted on one side of the rail 11, the outer side, to be carried thereby, and a like track 18 is mounted to one side of the rail 12 to be carried thereby. These tracks 17 and 18 have their openings 19 directed one toward the other. In the form herein shown, these rails 17 and 18 are fixed each to an angle iron 20 and 21 respectively in turn fixed to the outer sides of the rails 11 and 12. Each of these tracks 17 and 18 carries a roller 22 and 23 respectively therewithin, and a trunnion 24 and 25 extends from each of the respective rollers outwardly one toward the other through the track openings 19.

A channel member 26 is rockably connected by one end to the bracket 15 and a like channel member 27 is rockably connected by a corresponding end to the bracket 16. Channel irons 28 and 29 have common ends interengaging the trunnions 24 and 25 and respectively cross the channel members 26 and 27 to be rockably interconnected therewith such as by the bolts 30 and 31, Fig. 4. The channel members 26, 28 and 27, 29 extend beyond the pivot bolts 30 and 31 to carry by their other end portions interconnecting cross members or bars 32 and 33 respectively.

A pair of legs 34 and 35 have common ends rockably carried by the cross member or bar 32, at zones adjacent the ends of the channel members 26 and 27. These legs 34 and 35 extend from the cross member or bar 32 to have their other end portions rockably engaged with a rocker shaft or bearing rod 36. The legs 34 and 35 diverge by their ends removed from the cross member or bar 32 one toward the other in a more or less V manner. A pair of legs 37 and 38 have common ends rockably mounted on the cross member or bar 33 and in diverging manner one toward the other are carried to the shaft or bearing rod 36 to be rockably engaged therewith.

A pair of hydraulic, lifting jacks 39 and 40 are attached to and positioned between the side rails 11 and 12. These jacks 39 and 40 are of a telescoping nature wherein a plurality of cylinders, herein shown as five in number may be extended from the base all under hydraulic pressure. These jacks 39 and 40 are well known to those versed in the art, and the details thereof are accordingly not herein shown nor described. The innermost cylinders 41 and 42 of these jacks 39 and 40 have their outer ends rockably engaging the shaft 36.

Figure 2:
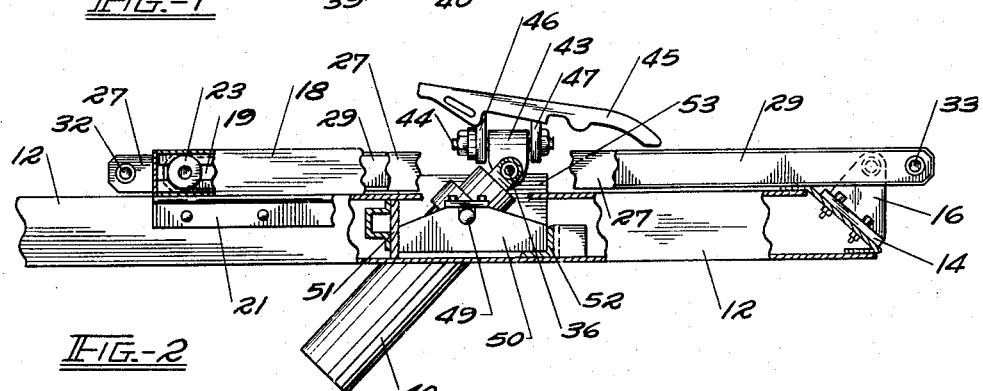
Fig. 2 is a detail in side elevation and partial section on an enlarged scale of the elevating mechanism in a lowered condition.

In Figs. 1 and 4, the structure is shown in its uppermost, lifted condition. On the shaft or bearing rod 36 a saddle 43 is provided and is free to rock in a fore and aft direction as shown in Fig. 2. The saddle 43 carries a pin 44 in a fore and aft direction, and on this pin 44 is rockably mounted a fifth wheel 45 of the usual and well known construction, the fifth wheel 45 having the pin 44 extending through a pair of down turned ears 46 and 47 which straddle the saddle 43. By this mounting of the fifth wheel 45, there is secured a universal rocking thereof on the shaft or bearing rod 36.

It is to be particularly noted, that the vertical center line through the fifth wheel 45 and through the shaft 36 will coincide with the king pin (not shown) of a trailer 48 when it is interconnected with the fifth wheel 45 and bears thereon all in the usual and well known manner. For sake of clearness, the interlatching of this king pin with the fifth wheel 45 is omitted in the drawings.

Assuming that the trailer 48 has been elevated by its forward end as indicated in Fig. 1 by a lifting action of the jacks 39 and 40, and it is desired to lower that front end of the trailer 48, pressure is released from the jacks 39 and 40 to allow the channel members 26, 28 and 27, 29 to rock about their pivots 30, 31 to spread apart the cross members or bars 32 and 33 and at the same time cause the lower ends of the members 28 and 29 to travel forwardly as they may be guided by the rollers 22 and 23 which carry the load imposed on those channel members, thereby advancing the rollers 22 and 23 along the tracks 17 and 18.

Figure 3:
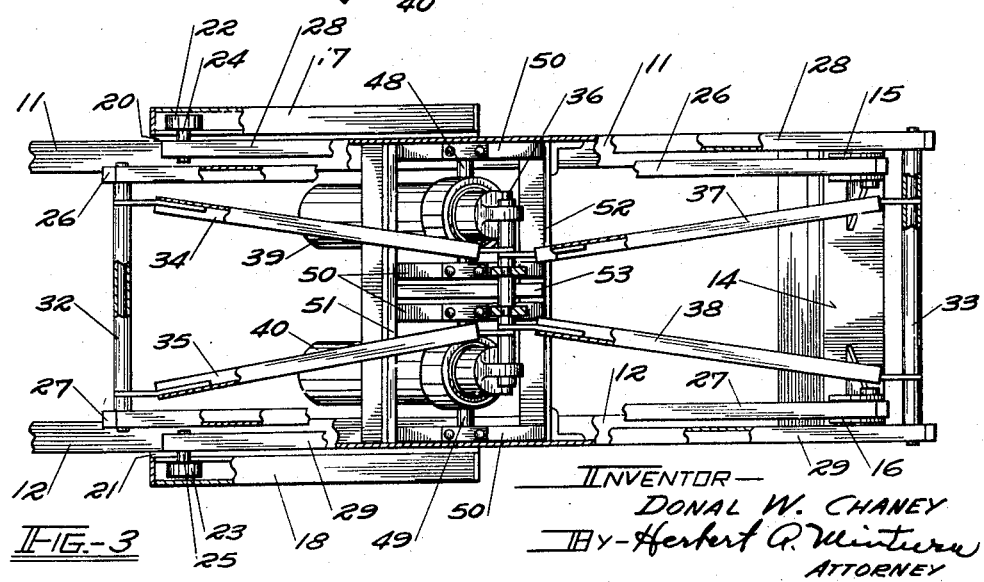
Fig. 3 is a view in top plan of the elevating mechanism.

Simultaneously, the legs 34, 35 and 37, 38 will rock by their lower ends outwardly one from the other to bring all four of those legs eventually into their lowered, horizontally disposed positions as indicated in Figs. 2 and 3. In this manner, the fifth wheel 45 will be lowered to the position as indicated in Fig. 2 which is the normal position for pulling the trailer 48 by the tractor 10 in traveling about. As these various members shift as has been indicated, the jacks 39 and 40 will rock by their lower end portions on trunnions 48 and 49, Fig. 3, to have the lower ends of the jacks lifted somewhat by their lower ends for road clearance. These trunnions 48 and 49 are outwardly supported as above indicated by the side rails 11 and 12, and are supported intermediate of the jacks 39 and 40 by members 50 extending across and between the chassis cross members 51 and 52, Fig. 3.

The lower ends of the channel members 26 and 27 being rockably fixed on a common transverse axis in respect to the brackets 15 and 16, retain the entire mechanism in attached condition to the rails 11 and 12, thereby stabilizing the fifth wheel 45 as between the bearings on those brackets, the bearings of the rollers 22 and 23 in their tracks 17 and 18, and the upper ends of the jack cylinders 41 and 42 being at the apex of the axis of the shaft 36 serving as fore and aft braces between the cross members or bars 32 and 33. The lower end portions of the channel members 28 and 29 are restrained from lifting or dropping in view of their connected rollers 22 and 23 preventing such travel. The use of the two jacks 39 and 40 prevents any tendency to tilt the fifth wheel 45 laterally of the rails 11 and 12.

The end portions of the legs 34, 35 and 37, 38 adjacent the shaft or bearing rod 36 will come to rest across the cross members 51 and 52, and the channel members 26, 28 and 27, 29 will come to rest along the rails 11 and 12, thereby providing a solid foundation supporting the fifth wheel 45 when in its lowered, trailer transport position.

The fifth wheel 45 when in its lowered position is further supported by a centrally disposed rest plate 53 extending between and fixed to the chassis cross members 51 and 52. As shown in Figs. 2 and 3, this plate 53 provides an additional solid foundation supporting the shaft or bearing rod 36 thereacross.

Therefore it is to be seen that I have provided a very solid, and most effective lifting and lowering device in a compact form for lifting and stabilizing the front end of a trailer, and while the invention has been described in the more or less detailed manner in relation to the one particular form, it is obvious that structural changes may be employed without departing from the spirit of the invention, and I therefore do not desire to be limited to that precise form beyond the limitations which may be imposed by the following claim.

I claim:

The combination with a trailer hauling tractor having a chassis including a pair of fore and aft extending, laterally spaced apart first and second side rails; of first and second tracks fixed to and extending along said first and second rails; a rear cross member interconnecting rear end portions of said rails; first and second brackets fixed to said cross member in laterally spaced apart relations; a first elongated member rockably attached by an end portion to said first bracket; a second elongated member rockably attached to said second bracket; a third elongated member; a roller rotatively carried by an end portion of said third member and engaging said first track; said first and third members being above said first rail; means rockably interconnecting said first and third members at a common distance therealong from an intermediate said roller and said first bracket; a fourth elongated member; a roller rotatively carried by an end portion of the fourth member and engaging said second track; said second and fourth members crossing one another; means rockably interconnecting the second and fourth members at said crossing and at common distances from said second bracket and said fourth member roller, said second and fourth members being above said second rail; a cross bar rockably interconnecting the ends of said first and second elongated members said ends of which are removed from the bracket connected ends thereof and retaining those elongated member ends in spaced apart relation; a second cross bar rockably interconnecting and spacing apart the ends of said third and fourth elongated members which are spaced apart from the roller carried ends of those members; one pair of legs shorter than said elongated members rockably connected with said first and second member cross bars by common ends; a second pair of legs of lengths common to said one pair and rockably connected by common ends with said first and second cross bars; a bearing rod; said two pairs of legs being rockably connected by end portions removed from their first end portions to said bearing rod; a pair of hydraulic lift jacks rockably interconnected by common end portions, one jack adjacent each of said side rails, and rockably interconnected by opposite ends to said bearing rod and said rails, one opposite end being spaced along said rod from the other opposite end; and a fifth wheel carried by said bearing rod rockably thereon in fore and aft directions.

References Cited in the file of this patent

UNITED STATES PATENTS

| | | |
|---|---|---|
| 587,960 | Hammer | Aug. 10, 1897 |
| 652,757 | Ege | July 3, 1900 |
| 955,875 | Hunt | Apr. 26, 1910 |
| 1,261,633 | Shuford | Apr. 2, 1918 |
| 1,405,301 | De Vol | Jan. 31, 1922 |
| 1,498,813 | Sankela et al. | June 24, 1924 |
| 2,027,098 | Helms | Jan. 7, 1936 |
| 2,459,506 | Demster et al. | Jan. 18, 1949 |
| 2,710,224 | Horvath | June 7, 1955 |
| 2,734,519 | Widdowson | Feb. 14, 1956 |